(12) United States Patent
Gomis et al.

(10) Patent No.: US 12,212,213 B2
(45) Date of Patent: Jan. 28, 2025

(54) ELECTRIC ACTUATOR FOR A HEATING, VENTILATION AND/OR AIR CONDITIONING SYSTEM

(71) Applicant: Valeo Systemes Thermiques, Le Mesnil Saint-Denis (FR)

(72) Inventors: Dione Gomis, Le Mesnil Saint-Denis (FR); Rawane Seck, Le Mesnil Saint-Denis (FR); Sébastien Colinet, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 617 days.

(21) Appl. No.: 17/421,643

(22) PCT Filed: Jan. 7, 2020

(86) PCT No.: PCT/FR2020/050014
§ 371 (c)(1),
(2) Date: Jul. 8, 2021

(87) PCT Pub. No.: WO2020/144426
PCT Pub. Date: Jul. 16, 2020

(65) Prior Publication Data
US 2022/0085691 A1    Mar. 17, 2022

(30) Foreign Application Priority Data
Jan. 8, 2019  (FR) ...................................... 1900162

(51) Int. Cl.
| *H02K 7/116* | (2006.01) |
| *B60H 1/00* | (2006.01) |
| *F16H 19/08* | (2006.01) |
| *H02K 1/2791* | (2022.01) |

(52) U.S. Cl.
CPC ............. *H02K 7/116* (2013.01); *F16H 19/08* (2013.01); *H02K 1/2791* (2022.01); *B60H 2001/00707* (2013.01)

(58) Field of Classification Search
CPC ...... H02K 7/116; H02K 1/2791; H02K 21/22; H02K 2213/03; F16H 19/08;
(Continued)

(56) References Cited

U.S. PATENT DOCUMENTS 3,596,538 A * 8/1971 Braun ....................... F16H 1/46
                                                          475/341
5,521,478 A * 5/1996 Bernreuther ........ F16K 37/0041
                                                          310/68 B
(Continued)

FOREIGN PATENT DOCUMENTS

DE           10300641 A1     7/2004
KR     210070028947 A  *  3/2007

OTHER PUBLICATIONS

International Search Report and Written Opinion issued in corresponding International Patent Application No. PCT/FR2020/050014, mailed on Mar. 12, 2020 (11 pages).

*Primary Examiner* — Avinash A Savani
*Assistant Examiner* — Frances F. Hamilton
(74) *Attorney, Agent, or Firm* — Osha Bergman Watanabe & Burton LLP (57) ABSTRACT

The present invention relates to an electric actuator (50) suitable for driving a movable element for a heating, ventilation and/or air conditioning system for a motor vehicle, including an electric motor (2) comprising a stator (3), a rotor (4) extending along an axis (X), a pinion (5) rigidly connected to the rotor (4), a drive mechanism (6) comprising: a planet carrier (7), at least one planet gear (8) held by the planet carrier (7), the planet gear (8) being suitable for being rotated by the pinion (5), an output ring gear (11)
(Continued)

suitable for being rotated by the at least one planet gear (8), a drive socket (12) rigidly connected to the output ring gear (11) and suitable for driving the movable element, the drive socket (12) being at a distance from the electric motor (2) along the direction of the axis (X) of the rotor (4).

10 Claims, 5 Drawing Sheets

(58) Field of Classification Search
CPC ....... F16H 2001/288; F16H 2001/2881; B60H 2001/00707
USPC ................................................ 454/143, 155
See application file for complete search history.

(56) References Cited

U.S. PATENT DOCUMENTS

| | | | | |
|---|---|---|---|---|
| 6,033,336 A * | 3/2000 | Bae | ........................... | F16H 1/46 475/341 |
| 6,104,112 A * | 8/2000 | Vanjani | .................. | H02K 7/116 310/67 R |
| 6,383,071 B1 * | 5/2002 | Takeuchi | ........... | B60H 1/00857 454/333 |
| 6,632,154 B2 * | 10/2003 | Ushikoshi | ................. | F16H 1/46 475/341 |
| 10,458,519 B2 * | 10/2019 | Guttenberger | ........ | F16H 57/023 |
| 11,031,842 B2 * | 6/2021 | Watrin | ...................... | F16H 1/16 |
| 2005/0046290 A1 * | 3/2005 | Baukholt | .................. | F16H 1/46 475/341 |
| 2012/0074820 A1 * | 3/2012 | Takeuchi | ............... | H02K 29/08 310/75 R |
| 2015/0071787 A1 * | 3/2015 | Scouarnec | ................ | F01P 5/02 416/223 R |
| 2015/0217633 A1 * | 8/2015 | Huijzers | .............. | B60K 11/085 454/145 |
| 2018/0141403 A1 * | 5/2018 | Komowski | .......... | B60H 1/0055 |
| 2022/0085691 A1 * | 3/2022 | Gomis | ................... | H02K 7/116 |

* cited by examiner

ELECTRIC ACTUATOR FOR A HEATING, VENTILATION AND/OR AIR CONDITIONING SYSTEM

BACKGROUND

The present invention relates to an electric actuator for a heating, ventilation and/or air conditioning system. A particular application relates to a heating, ventilation and/or air conditioning system for a motor vehicle, incorporating such an actuator.

The temperature prevailing inside the passenger compartment of a motor vehicle is managed by a heating, ventilation and/or air conditioning system. Such an installation includes different heat exchangers, through which different air flows pass before reaching the passenger compartment. These exchangers make it possible to heat or cool the different air flows before they are admitted to the passenger compartment. The temperature is controlled by modifying the flow rate of the different air flows. To this end, the installation includes several movable flaps that make it possible to adjust the flow rate of each air flow. The position of each of the movable flaps is controlled by an electric actuator.

Electric actuator is given to mean an actuator including an electric motor and an actuating mechanism driven by the electric motor. The actuating mechanism makes it possible to adapt the rotational speed of the electric motor in order to adjust the force available at the drive socket of the actuator. The air flow rate control flaps can be rotatable. In this case, the flap is rigidly connected to a rotating shaft and the electric actuator drives this rotating shaft. As far as possible, the electric actuator must have a small footprint in order to facilitate the incorporation thereof into the heating, ventilation and/or air conditioning system.

It is known practice to propose an electric actuator the actuating mechanism of which comprises a planetary gear set. Such a mechanism makes it possible to obtain a beneficial gear reduction ratio between the electric motor and the drive socket of the actuator.

It is also known practice to propose an electric actuator having a hollow electric motor, allowing the shaft of the flap to pass through the motor. The axial footprint of the actuator is thus particularly reduced.

This configuration has one drawback however, which is that the drive wheel, which is hollow, must have a sufficient diameter to allow the shaft of the flap to pass through. The ratio between the diameter of the outer ring gear of the planetary gear set and the diameter of the drive wheel, acting as a planet pinion, is thus limited. The gear reduction ratio that can be achieved with such a configuration can thus be inadequate to obtain sufficient actuating forces, or can lead to the oversizing of the electric motor in order to overcome this inadequacy. The cost and footprint of the electric motor is thus increased.

SUMMARY

The invention proposes to improve this situation by providing an arrangement of the elements of the drive mechanism of the actuator that makes it possible to increase the gear reduction ratio. It is thus possible to supply an actuator capable of actuating flaps offering increased strength, while retaining a compact footprint.

The invention thus proposes an electric actuator suitable for driving a movable element for a heating, ventilation and/or air conditioning system for a motor vehicle, including:

an electric motor comprising:
a stator,
a rotor extending along an axis,
a pinion rigidly connected to the rotor,
a drive mechanism comprising:
a planet carrier,
at least one planet gear held by the planet carrier, the planet gear being suitable for being rotated by the pinion,
an output ring gear suitable for being rotated by the at least one planet gear,
a drive socket rigidly connected to the output ring gear and suitable for driving the movable element,
the drive socket being at a distance from the electric motor along the direction of the axis of the rotor.

The movable element of the heating, ventilation and/or air conditioning system thus does not pass through the motor. The electric motor can be sized so as to optimize the magnetic circuit, as it is no longer necessary to provide a hollow portion.

According to one embodiment, the at least one planet gear is translatably connected to and free to rotate relative to the planet carrier.

According to one embodiment, the drive socket extends along the axis of rotation of the electric motor.

According to a preferred embodiment of the electric actuator, the pinion rigidly connected to the rotor is facing the drive socket along an axial direction.

The diameter of the drive pinion rigidly connected to the rotor can thus be selected so as to increase the gear reduction ratio between the rotor and the drive socket. In particular, the diameter of the drive pinion can be smaller than the diameter of the drive socket.

According to one embodiment of the electric actuator, the drive socket comprises a recess arranged to receive a protruding portion of the movable element, the recess being closed at least partially by a base.

According to a preferred embodiment, the pinion rigidly connected to the rotor is facing the base of the recess of the drive socket.

According to a preferred embodiment, the rotor is outside the stator.

Advantageously, the at least one planet gear includes a first gear stage and a second gear stage rigidly connected to the first gear stage, the two gear stages being coaxial and having different diameters.

As a variant, the at least one planet gear includes a first gear stage and a second gear stage rigidly connected to the first gear stage, the two gear stages being coaxial and having identical diameters.

Preferably, the two gear stages of the at least one planet gear form a one-piece assembly.

According to a preferred embodiment, the electric actuator includes an outer ring gear fixed relative to the stator.

According to a preferred embodiment, the first gear stage is suitable for meshing with the outer ring gear.

According to a preferred embodiment, the second gear stage is suitable for meshing with the output ring gear.

Advantageously, the electric actuator includes a housing accommodating the electric motor and the drive mechanism.

Advantageously, the housing is configured to be fastened onto the heating, ventilation and/or air conditioning system.

Preferably, the stator is received in a cylindrical chamber having a closed base.

Also preferably, the rotor is received in the cylindrical chamber.

According to one embodiment, the electric actuator includes at least two planet gears, each planet gear being translatably connected to and free to rotate relative to the planet carrier.

According to a preferred embodiment, the electric actuator includes three planet gears, each planet gear being translatably connected to and free to rotate relative to the planet carrier.

This configuration allows satisfactory distribution of the internal forces in the actuator and makes it possible to limit the forces on the teeth of the planet gears.

According to another embodiment, the electric actuator includes four planet gears, each planet gear being translatably connected to and free to rotate relative to the planet carrier.

Advantageously, the drive socket is positioned radially between the axes of the planet gears.

The footprint along the direction of the axis of rotation of the motor is thus limited.

According to a preferred embodiment, the drive socket forms a one-piece assembly with the output ring gear.

Preferably, the output ring gear is molded.

Advantageously, the drive socket is suitable for rotating a rotating shaft of the movable element.

The drive socket thus has a shape that complements the shape of the end of the rotating shaft of the movable element. On assembly, the end of the shaft must simply be inserted into the drive socket to rigidly connect the two parts for conjoint rotation.

According to one embodiment, the drive socket includes splines.

According to another embodiment, the drive socket includes a polygonal perimeter.

Preferably, the drive socket includes a shoulder, an orifice of the actuator housing surrounding the shoulder.

This shoulder makes it possible to center and guide the drive socket in the actuator housing.

According to one embodiment, the rotor includes a cylindrical wall extending along an axis and a flange extending transverse to the axis.

Advantageously, the cylindrical wall of the rotor includes an inner face on which magnets are positioned.

According to one embodiment, the flange is disk-shaped. The flange can be solid or perforated.

Advantageously, the pinion rigidly connected to the rotor and the magnets are situated axially on either side of the flange.

According to one embodiment, the stator includes electromagnetic coils positioned on a printed circuit board.

Preferably, the printed circuit board is positioned on the base of the cylindrical chamber.

According to one embodiment, the rotor includes a guide shaft inserted into a central bore of the stator.

The assembly of the rotor is thus simplified. The axial footprint of the motor is reduced.

According to one embodiment, the stator includes at least three coils positioned in a star shape around the central bore.

Advantageously, the rotor is made from plastic or metal.

According to one embodiment, each planet gear is made from plastic or metal.

Advantageously, each planet gear is molded.

According to a preferred embodiment, the diameter of the second gear stage is smaller than the diameter of the first gear stage.

The gear reduction ratio between the pinion of the electric motor and the drive socket of the actuator is dependent on the difference in diameter between the two gear stages. The closer the diameters, the higher the gear reduction ratio. In other words, the closer the diameters, the slower the drive socket turns for a given rotational speed of the motor. High drive torque can thus be obtained, which makes it possible to ensure that the movable element does not lock up, even in extreme conditions of use.

The invention also relates to a heating, ventilation and/or air conditioning system for a motor vehicle, including at least one air circulation duct and a movable shutter configured to control an air flow in the duct, the flap being configured to be driven by an electric actuator as described above.

Further features and advantages of the invention will become apparent on reading the detailed description of the embodiments given as non-limiting examples, accompanied by the figures below:

DETAILED DESCRIPTION

Figure 1:
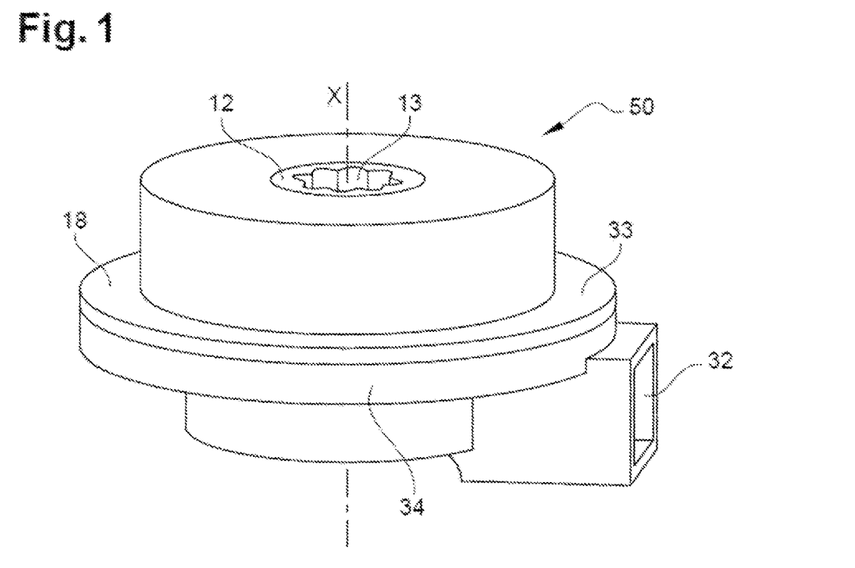
FIG. 1 is an overall perspective view of an electric actuator according to the invention.

FIG. 1 shows an electric actuator 50 suitable for driving a movable element for a heating, ventilation and/or air conditioning system for a motor vehicle. The movable element is for example a rotating flap that makes it possible to distribute the respective flow rate of two flows of air that are being mixed. It is thus possible to control, that is, adjust to a desired value, the temperature of the passenger compartment. The adjustment of the position of the flap makes it possible to adjust the distribution between the hot air and the cold air produced by the heating, ventilation and/or air conditioning system.

The flap can be a rotating flap mounted on a shaft. The shaft is rotated by the electric actuator 50. An electronic control unit, not shown, controls the position of the movable flap by governing the electric current powering the actuator 50. The heating, ventilation and/or air conditioning system, which is well known, is not shown.

FIG. 1 is an overall view of the electric actuator 50. The electric actuator 50 includes a housing 18 accommodating the electric motor 2 and the drive mechanism 6. The housing 18 is configured to be fastened onto the heating, ventilation and/or air conditioning system. To this end, the housing 18 includes fastening lugs, not shown, through which screws can pass that enter tapped holes in the heating, ventilation and/or air conditioning system. The actuator 50 is thus fastened onto the heating, ventilation and/or air conditioning system. The housing 18 comprises an upper shell 33 and a lower shell 34. The two shells 33, 34 are rigidly connected, for example by welding.

Figure 2:
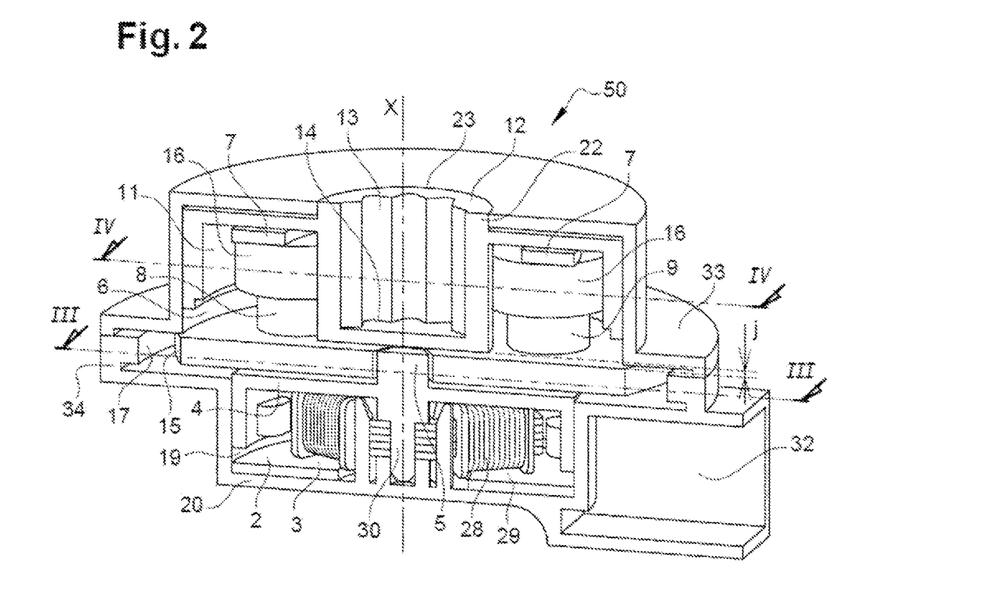
FIG. 2 is a cross-sectional view of the of the actuator in FIG. 1.

The electric actuator 50, which is shown in detail in FIG. 2, includes:
an electric motor 2 comprising:
a stator 3,
a rotor 4 extending along an axis X,
a pinion 5 rigidly connected to the rotor 4,
a drive mechanism 6 comprising:
a planet carrier 7,
at least one planet gear 8 held by the planet carrier 7, the planet gear 8 being suitable for being rotated by the pinion 5,
an output ring gear 11 suitable for being rotated by the at least one planet gear 8,
a drive socket 12 rigidly connected to the output ring gear 11 and suitable for driving the movable element 1, the drive socket 12 being at a distance from the electric motor 2 along the direction of the axis X of the rotor 4.

In other words, there is axial clearance, labeled j in FIG. 2, between the electric motor 2 and the drive socket 12.

The movable element of the heating, ventilation and/or air conditioning system thus does not pass through the electric motor 2. The electric motor 2 can be sized so as to optimize the magnetic circuit, as it is no longer necessary to provide a hollow portion in the rotor and the stator, allowing the shaft of the movable element to pass through them.

The electric motor 2 extends along an axis X. The drive socket 12 extends along the axis X of rotation of the electric motor 2. The pinion 5 rigidly connected to the rotor 4 is facing the drive socket 12 along an axial direction.

The drive socket 12 comprises a recess 13 arranged to receive a protruding portion of the movable element. The recess 13 is closed at least partially by a base 14. The pinion 5 rigidly connected to the rotor 4 is facing the base 14 of the recess 13 of the drive socket 12. There is clearance, along the direction of the axis X, between the pinion 5 and the base 14. This clearance is labeled j in FIG. 2.

Due to this arrangement, the diameter of the drive pinion 5 rigidly connected to the rotor 4 can thus be selected so as to increase the gear reduction ratio between the rotor 4 and the drive socket 12. In particular, the diameter of the drive pinion 5 can be selected to be smaller than the diameter of the drive socket 12, which promotes the obtaining of a high gear reduction ratio.

Here, the rotor 4 is outside the stator 3. In other words, the stator 4 is situated in the center of the electric motor 2. The rotor 4 surrounds the stator 3.

The drive mechanism 6 of the electric actuator 50 comprises a planetary gear set. The pinion 5 forms the planet pinion of the planetary gear set, which drives the other elements of the planetary gear set. The pinion 5 meshes with the at least one planet gear 8, which is translatably connected to and free to rotate relative to the planet carrier 7. Advantageously, the electric actuator includes at least two planet gears 8, 9, each planet gear 8, 9 being translatably connected to and free to rotate relative to the planet carrier 7.

In the example described here, the electric actuator 50 includes three planet gears 8, 9, 10, each planet gear 8, 9, 10 being translatably connected to and free to rotate relative to the planet carrier 7. The configuration with three planet gears allows satisfactory distribution of the internal forces in the actuator and makes it possible to limit the forces on the teeth of the planet gears 8, 9, 10. Each planet gear has an axis of rotation. The axes of rotation are parallel.

The electric actuator 50 also includes an outer ring gear 17 that is fixed relative to the stator 3. The outer ring gear 17 has internal teeth. The teeth are not shown in FIG. 2. The at least one planet gear 8 includes a first gear stage 15 and a second gear stage 16 rigidly connected to the first gear stage 15, the two gear stages 15, 16 being coaxial and having different diameters D1, D2.

In the case described here, in which the drive mechanism 6 includes several planet gears, each planet gear 8, 9, 10 includes a first gear stage 15 and a second gear stage 16 rigidly connected to the first gear stage 15, the two gear stages 15, 16 being coaxial and having different diameters D1, D2.

Figure 3:
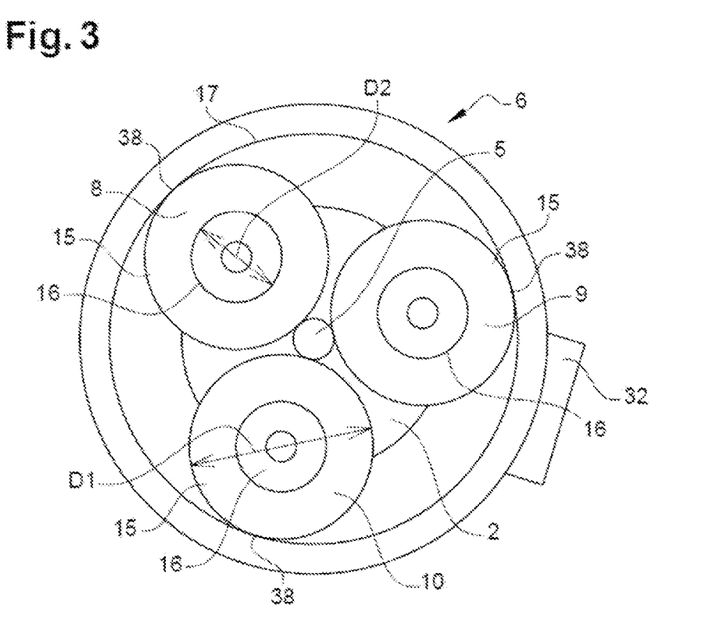
FIG. 3 is a first cross-sectional view of the actuator, illustrating the drive mechanism.
Figure 4:
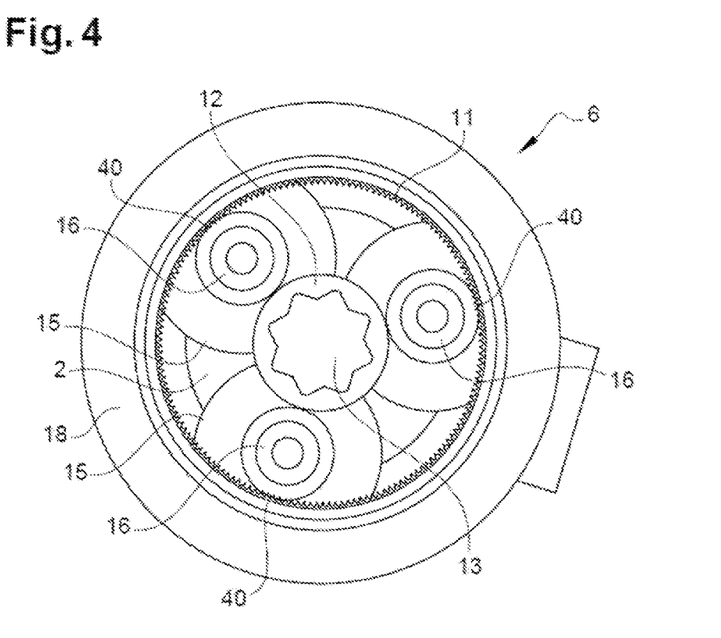
FIG. 4 is a second cross-sectional view of the actuator, illustrating the drive mechanism.

FIGS. 3 and 4 show details of the elements of the drive mechanism 6, and in particular of the planetary gear set. In order to simplify these figures, the planet carrier is not shown. As is well known, the planet carrier holds the planet gears fixed in translation relative to each other, and allows them to rotate freely about their respective axes. Each planet gear 8, 9, 10 meshes with the teeth of the outer ring gear 17.

More specifically, the first gear stage 15 is suitable for meshing with the outer ring gear 17. As the ring gear 17 is fixed, the rotational movement of the pinion 5 of the electric motor 2 turns the planet carrier 7 about the axis X. The point labeled 38 in FIG. 3 represents the point of contact between the first gear stage 15 and the outer ring gear 17. The second gear stage 16 is suitable for meshing with the output ring gear 11. The output ring gear 11 has internal teeth.

As the two gear stages 15, 16 of the at least one planet gear have different diameters, the speed of the point of contact between the output ring gear 11 and the second gear stage 16 is non-zero. The point labeled 40 in FIG. 4 represents the point of contact between the second planet gear stage 16 and the output ring gear 11. The output ring gear 11 is thus rotated when the pinion 5 turns.

The output ring gear 11 has a drive socket 12. More specifically, the drive socket 12 here forms a one-piece assembly with the output ring gear 11. The output ring gear 11 is molded. The body of the output ring gear 11, the teeth and the drive socket form part of the same part obtained by molding.

Here, the diameter D2 of the second gear stage 16 is smaller than the diameter D1 of the first gear stage 15. The output ring gear 11 thus has the same direction of rotation as the pinion 5. This arrangement also makes it possible to reduce the radial footprint of the actuator at the drive socket 12.

The gear reduction ratio between the pinion 5 of the electric motor and the drive socket 12 of the actuator 50 is dependent on the difference in diameter D1, D2 between the two gear stages 15, 16. The closer the values of the diameters D1, D2, the higher the gear reduction ratio. In other words, the closer the diameters, the slower the drive socket 12 turns for a given rotational speed of the electric motor. High drive torque can thus be obtained, which makes it possible to ensure that the movable element does not lock up, even in extreme conditions of use. In FIGS. 3 and 4, the difference between the diameter D1 and the diameter D2 has been exaggerated.

In the example illustrated, the two gear stages 15, 16 of the at least one planet gear form a one-piece assembly. Each planet gear 8, 9, 10 is molded. Each planet gear 8, 9, 10 is made from plastic. Each planet gear 8, 9, 10 can also be made from metal.

As can be seen in FIG. 2, the drive socket 12 is positioned radially between the axes of the planet gears 8, 9, 10. The footprint along the direction of the axis X of rotation of the electric motor is thus limited. The incorporation of the actuator is facilitated, which makes it possible to use the same actuator for a wide range of applications.

The drive socket 12 is suitable for rotating a rotating shaft of the movable element. The drive socket 12 thus has a shape that complements the shape of the end of the rotating shaft of the movable element. On assembly, the end of the shaft must simply be inserted into the drive socket 12 to rigidly connect the two parts for conjoint rotation. As can be seen in FIGS. 1 and 2, the drive socket 12 includes a polygonal perimeter.

The drive socket 12 includes a shoulder 22, an orifice 23 of the housing 18 of the actuator 50 surrounding the shoulder 22. This shoulder makes it possible to center and guide the drive socket 12 in the housing 18 of the actuator 50.

The stator 3 is received in a cylindrical chamber 19 having a closed base 20. Likewise, the rotor 4 is received in the cylindrical chamber 19. The cylindrical chamber 19 forms part of the lower shell 34.

Figure 5:
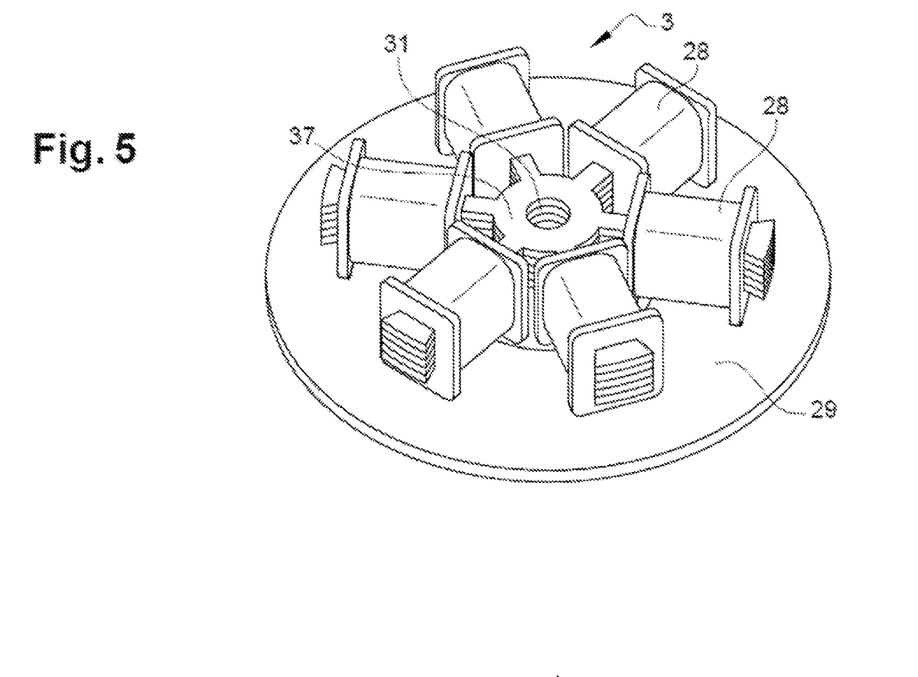
FIG. 5 is a partial perspective view of the stator of the electric motor of the actuator.

FIG. 5 shows the stator 3 in detail. The stator 3 includes electromagnetic coils 28 positioned on a printed circuit board 29. The electric current flowing in the electromagnetic coils 28 generates a magnetic field that makes it possible to turn the rotor 4. The printed circuit board 29 is positioned on the base 20 of the cylindrical chamber 19.

The actuator 50 comprises a connector 32. The connecting lugs of the connector 32, not shown, make it possible to control the flow of the electric current in the coils of the stator 3 in order to create the magnetic field with which the permanent magnets 27 of the rotor 4 interact.

Figure 6:
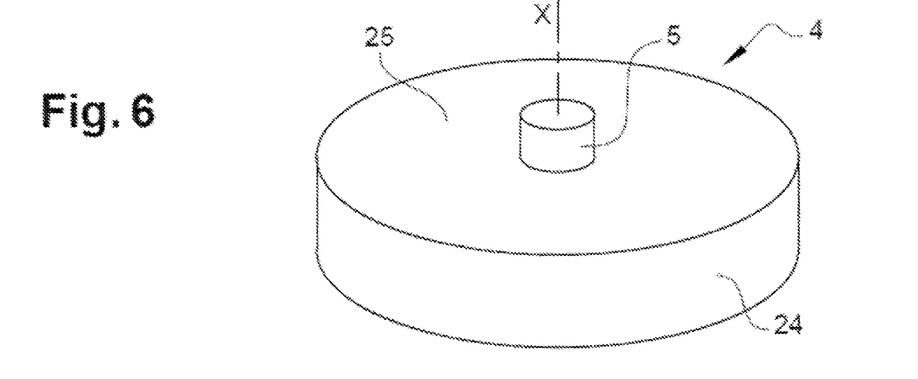
FIG. 6 is a first perspective view of the rotor of the electric motor of the actuator.
Figure 7:
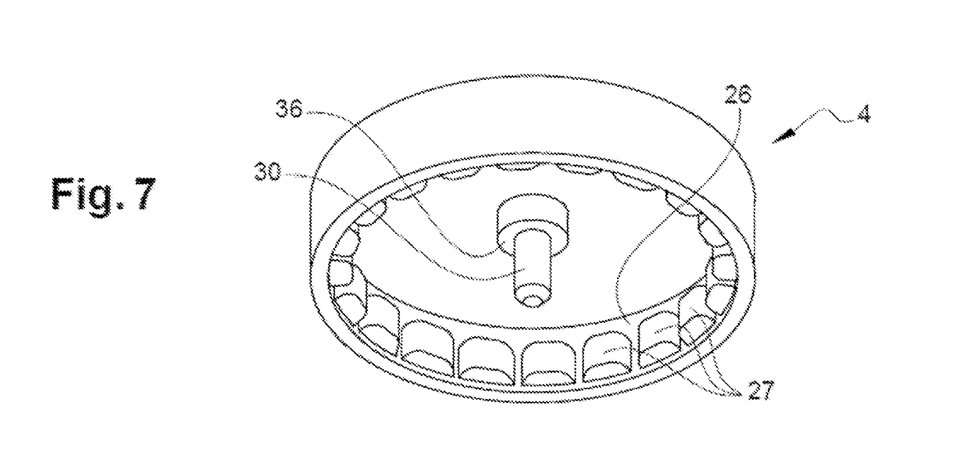
FIG. 7 is a second perspective view of the rotor of the electric motor of the actuator.

FIGS. 6 and 7 show details of the rotor 4. The rotor 4 includes a cylindrical wall 24 extending along an axis X and a flange 25 extending transverse to the axis X. The cylindrical wall 24 of the rotor 4 includes an inner face 26 on which magnets 27 are positioned. The permanent magnets 27 can for example be bonded to the inner face 26 of the rotor 4. The permanent magnets 27 can also be overmolded so that they are incorporated into the material of the rotor 4. The flange 25 is disk-shaped. The pinion 5 rigidly connected to the rotor 4 and the magnets 27 are situated axially on either side of the flange 25.

The rotor 4 includes a guide shaft 30 inserted into a central bore 31 of the stator 3. The central bore 31 is made in the stack of laminations contained in the magnetic circuit of the stator 3. The guide shaft 30 includes a shoulder 36 that abuts on the periphery 37 of the central bore 31 of the stator 3. The assembly of the rotor 4 in the stator 3 is thus simplified. The axial footprint of the electric motor 2 is reduced. The rotor 4 can be made from plastic or metal. The stator 3 includes at least three coils 28 positioned in a star shape around the central bore 31. In the example illustrated in FIG. 5, the stator includes six coils 28.

The invention also relates to a heating, ventilation and/or air conditioning system for a motor vehicle, including at least one air circulation duct and a movable shutter configured to control an air flow in the duct, the flap being configured to be driven by an electric actuator as described above.

The particular arrangement of the electric motor 2 and the drive mechanism 6 makes it possible to obtain an actuator with an optimized magnetic circuit, while remaining compact. The compactness of the electric actuator 50 allows it to be incorporated easily into the heating, ventilation and/or air conditioning system. In addition, the high gear reduction ratio obtained makes it possible to obtain significant forces while using small motors. This makes it possible to limit the cost of the electric motor, and therefore of the actuator.

The heating, ventilation and/or air conditioning system generally comprises several electric actuators as described above, each actuator managing the position of a separate flap.

According to embodiments not shown, the electric motor, together with the actuator incorporating this electric motor, can also comprise one or more of the features below, taken individually or in combination with each other:

The drive socket 12 can include splines,

The base 14 of the recess 13 of the drive socket 12 can comprise one or more openings, The at least one planet gear includes a first gear stage and a second gear stage rigidly connected to the first gear stage, the two gear stages being coaxial, and being able to have identical diameters, The electric actuator can include four planet gears, each planet gear being translatably connected to and free to rotate relative to the planet carrier.

Figure 8:
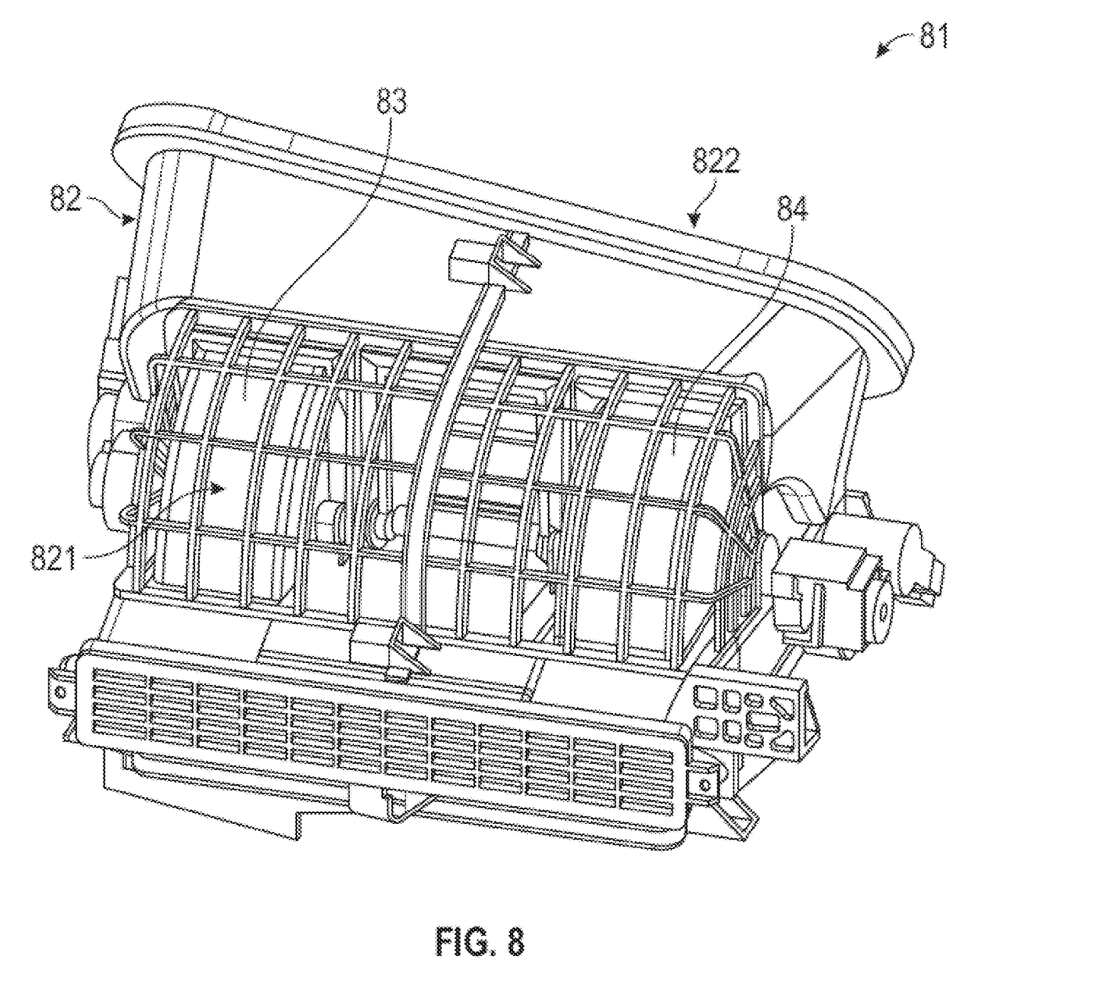
FIG. 8 is a heating, ventilation and/or air conditioning system for a motor vehicle according to the invention. In order to make the figures easier to read, the different elements are not necessarily shown to scale.

FIG. 8 shows a heating, ventilation and/or air conditioning (HVAC) system 81 for a motor vehicle. The HVAC system 81 includes at least one air circulation duct 82 and one or more movable elements 83, 84. For example, the air circulation duct 82 comprises at least two separate air circulation ducts 821, 822, to allow the flow of different air flows, in particular the recycling air flow and the flow of outside air within the HVAC system 81. The movable element is for example a rotating flap 83 that makes it possible to distribute the respective flow rate of two flows of air that are being mixed. The rotating flap 83 is configured to be driven by the electric actuator 50 as described above. The movable element is for example a movable shutter 84 configured to control an air flow in the air circulation duct 82.

Of course, other modifications and variations are apparent to a person skilled in the art following examination of the different embodiments illustrated. The invention is in no way limited to the embodiments described and illustrated in this application, which are given by way of example and are not intended to limit the scope of the invention.

The invention claimed is:

1. An electric actuator for rotating a flap mounted on a shaft for a heating, ventilation and/or air conditioning (HVAC) system for a motor vehicle, the electric actuator comprising:
    an electric motor comprising:
        a stator,
        a rotor extending along an axis, and
        a pinion rigidly connected to the rotor;
    a drive mechanism comprising:
        a planet carrier,
        at least one planet gear held by the planet carrier, wherein the at least one planet gear is rotated by the pinion;
    an output ring gear rotated by the at least one planet gear; and
    a drive socket comprising a recess with a base, wherein the drive socket:
        is rigidly connected to the output ring gear,
        drives the flap and
        wherein an axial clearance along the axis exists between an exterior face of the base and the pinion.

2. The electric actuator as claimed in claim 1, wherein the pinion faces the drive socket along the axis.

3. The electric actuator as claimed in claim 1,
    wherein the recess receives a protruding portion of the flap and wherein the recess is at least partially closed by the base of the recess, and wherein the pinion faces the base.

4. The electric actuator as claimed in claim 1, wherein the rotor surrounds the stator.

5. The electric actuator as claimed in claim 1, wherein the at least one planet gear includes:
  a first gear stage and
  a second gear stage rigidly connected to the first gear stage,
  wherein the first gear stage and the second gear stage are coaxial and have different diameters.

6. The electric actuator as claimed in claim 5, further comprising an outer ring gear fixed relative to the stator,
  wherein the first gear stage meshes with the outer ring gear, and
  wherein the second gear stage meshes with the output ring gear.

7. The electric actuator as claimed in claim 1,
  wherein the at least one planet gear comprises at least two planet gears,
  wherein each one of the at least two planet gears is translatably connected to and free to rotate relative to the planet carrier and
  wherein the drive socket is positioned radially between axes of the at least two planet gears.

8. The electric actuator as claimed in claim 1, wherein the rotor comprises:
  a cylindrical wall extending along the axis and
  a flange extending transverse to the axis.

9. The electric actuator as claimed in claim 8,
  wherein the cylindrical wall comprises an inner face on which magnets are positioned,
  wherein the flange is disk-shaped, and
  wherein the pinion and the magnets are situated axially on either side of the flange.

10. A heating, ventilation and/or air conditioning (HVAC) system for a motor vehicle, the HVAC system comprising:
  at least one air circulation duct;
  a movable flap configured to control an air flow in the at least one air circulation duct; and
  an electric actuator which rotates the flap mounted on a shaft, wherein the electric actuator comprises:
    an electric motor comprising:
      a stator,
      a rotor extending along an axis, and
      a pinion rigidly connected to the rotor, and
    a drive mechanism comprising:
      a planet carrier,
      at least one planet gear held by the planet carrier, wherein the at least one planet gear is rotated by the pinion;
    an output ring gear rotated by the at least one planet gear; and
    a drive socket comprising a recess with a base, wherein the drive socket:
      is rigidly connected to the output ring gear, drives the flap and
      wherein an axial clearance along the axis exists between an exterior face of the base and the pinion.

* * * * *